United States Patent [19]

Lambla et al.

[11] 4,026,962
[45] May 31, 1977

[54] DISPERSION-POLYMERIZATION PROCESS USING BLOCK COPOLYMERS

[75] Inventors: Morand Lambla, Hoenheim; Jean Terrisse, Pont a Mousson, both of France

[73] Assignee: Agence Nationale de Valorisation de la Recherche (ANVAR), Nueilly sur Seine, France

[22] Filed: May 2, 1975

[21] Appl. No.: 573,836

[30] Foreign Application Priority Data

May 7, 1974  France .............................. 74.15802

[52] U.S. Cl. ...................... 260/827; 260/29.6 RW; 260/29.7 UP; 260/879; 260/880 B; 260/884; 260/885; 260/886

[51] Int. Cl.² .................. C08L 53/00; C08L 83/10

[58] Field of Search ............... 260/827, 876 B, 859, 260/881, 886, 880 B, 29.7 UP, 29.6 RW, 885, 884, 879

[56] References Cited

UNITED STATES PATENTS

| | | | |
|---|---|---|---|
| 3,189,663 | 6/1965 | Nozaki | 260/885 |
| 3,189,664 | 6/1965 | Nozaki | 260/885 |
| 3,189,665 | 6/1965 | Nozaki | 260/885 |
| 3,264,234 | 8/1966 | Osmond | 260/885 |
| 3,317,635 | 5/1967 | Osmond | 260/881 |
| 3,382,297 | 5/1968 | Thompson | 260/875 |
| 3,514,500 | 5/1970 | Osmond | 260/886 |
| 3,673,272 | 6/1972 | Dean | 260/827 |
| 3,686,356 | 8/1972 | Saam | 260/825 |
| 3,691,257 | 9/1972 | Kendrick | 260/827 |
| 3,875,254 | 4/1975 | Dean | 260/827 |
| 3,888,945 | 6/1975 | Arndt et al. | 260/876 R |
| 3,903,201 | 9/1975 | Childers | 260/880 B |
| 3,917,741 | 11/1975 | McGarr | 260/859 |

*Primary Examiner*—Paul Lieberman
*Attorney, Agent, or Firm*—Oblon, Fisher, Spivak, McClelland & Maier

[57] ABSTRACT

There is disclosed a process of dispersion-polymerizing vinyl monomers promoted by free-radical catalysts. This process comprises dispersing under stirring in water a block copolymer of the A-B type wherein A represents a lipophilic block and B a hydrophilic block, adding one or more vinyl monomers containing the promoter and heating the mixture with stirring to the desired temperature. This process enables beads or balls of the desired polymer to be obtained having very regular size distribution.

10 Claims, No Drawings

DISPERSION-POLYMERIZATION PROCESS USING BLOCK COPOLYMERS

The present invention relates to a process of dispersion-polymerization of polymerizable monomers and, in particular, a process of free-radical polymerization of vinyl monomers dispersed in a liquid; the invention further relates to beads or balls obtained by said process and especially transparent beads or balls substantially free of materials extraneous to the base monomer.

It seems that the first proposal for polymerizing a finely divided monomer in suspension or in emulsion has been made around 1910, the stabilization of micelles of said monomer being then ensured by protecting colloids such as gelatin or egg albumin. Such processes which are disclosed in U.S. Pat. No. 1,149,577 and in German Pat. Nos. 250 690, 254 672 and 255 129, could not be used on a commercial scale since the reactions are slow and incomplete.

Also described in U.S. Pat. Nos. 1,864,978 and 1,732,795 and in German Pat. No. 558,590 is the use of a soap as emulsifyer in suspension polymerizations. However the soaps introduced in the process increased the solubility of the monomer in the aqueous phase and had an influence on the size and shape of obtained polymer particles, as well as on the clarity and the transparence thereof. Moreover, such soaps increased the water solubility of the monomer and promoted the introduction of impurities in the granules formed by the latter, thus reducing the transparence of the polymer beads.

Later on the use of macromolecular substances for stabilizing suspensions, e.g. of monomers to be polymerized, by attempting to achieve a substantial increase of viscosity of the reaction medium was proposed. Macromolecular substances could have included homopolymers or block terpolymers. In order to increase the viscosity of certain media it has been suggested to use copolymers, specifically grafted copolymers of starch and various monomers, said copolymers acting as thickeners.

It has now been found that it is possible to effect free-radical polymerization of vinyl monomers dispersed in a liquid, in particular, vinyl monomers suspended in water, by incorporating into the system a block copolymer of the type A-B wherein A represents a lipophilic polymer block and B represents hydrophilic polymer block, obtaining thereby polymer beads or balls, the particle size of which can be controlled at will and is in each case remarkably homogeneous.

The invention has for its object a method of free-radical polymerization of vinyl monomers dispersed in a liquid, which comprises dispersing with stirring in said liquid a block copolymer of the A-B type, wherein A represents a lipophilic polymer block and B represents a hydrophilic polymer block; adding the vinyl monomer or monomers to be polymerized, containing the polymerization promotor; and heating the mixture under stirring to the desired polymerization temperature, if necessary under pressure.

In accordance with a further aspect of the invention, the latter has for its object a process of free-radical polymerization of vinyl monomers suspended in water, which comprises dispersing under stirring in water a block copolymer of the type A-B as above defined; adding the vinyl monomer or monomers to be polymerized containing the polymerization promotor; and heating the mixture under stirring to the desired polymerization temperature, if necessary under pressure.

In accordance with a still further aspect of the invention, the latter has for its object a process of free-radical polymerization of vinyl monomers suspended in water, wherein the block copolymer of the A-B type as defined above comprises a lipophilic block A and a block B polar or made polar by reacting the base polymer with a compound which introduces polar groups onto the polymer block B.

Vinyl monomers usable in the process according to the invention are all vinyl monomers which may be polymerized by a free-radical polymerization mechanism, in particular substituted or non-substituted styrene, alkyl acrylates and methacrylates, vinyl acetate, acrylonitrile, vinyl chloride and mixtures thereof.

Thus, the said process enables not only polymers but also copolymers of vinyl monomers to be produced, for instance styrene/divinylbenzene copolymers.

The polymerization promoters usable in the process herein can be any suitable initiators or promoters familiar to those skilled in the art, capable of effecting a free-radical polymerization and, more specifically, peroxy-type promoters soluble in the organic phase of the polymerization system, for example, benzoyl or lauryl peroxide or a free-radical generator such as azo-bisisobutyronitrile.

The block copolymer of A-B type comrises a polymer block A of lipophilic type and a polymer B of hydrophilic type.

Monomers forming block A are preferably vinyl monomers, diene monomers and/or organo-silicon compounds, the vinyl monomers being particularly preferred.

Monomers forming block B are polar monomers or monomers made polar capable of forming in a known manner, preferably anionically, polymer blocks which are themselves polar or capable of being made polar or ionogenic.

While the monomers of block A can be selected amongst solvent monomers of said block, this is not indispensable and it is possible to select for that purpose monomers capable of providing a block A having a certain compatibility with, i.e. a certain affinity to adsorption for the vinyl monomer to be polymerized.

Thus, monomers for block A can be selected between styrene, isoprene, methyl-, hexyl-, heptyl- or lauryl methacrylate, vinyl chloride or dimethylsiloxane.

Amongst polymers which are polar or made polar and able to constitute a block B of copolymers of the A-B type or to be part of the composition of said block, there may be cited polymers carrying amine or amide groups completely or not substituted, polymers carrying heterocyclic nitrogen groups and polymers carrying anhydride or ester groups, and similar polymers.

In order to make said polymers hydrophilic, it is advantageous to quaternize the polymers carrying tertiary amine groups, entirely substituted amide groups or heterocyclic nitrogen groups, for example by treating in a known manner said polymers with mineral acids such as hydrochloric, sulfuric or phosphoric acid, organic compounds such as benzenesulfonic, toluenesulfonic or other arylsulfonic acids, or organohalogenated compounds such as ethyl bromide, n-butyl bromide or benzyl chloride. Likewise, it has been found especially advantageous to salify polymers previously hydrolyzed and carrying anhydride groups, said salifying being effected by means of such bases as sodium hydroxyde or potassium hydroxyde, or by means of amines containing less than 18 carbon atoms and giving, by reaction with aminolysed anhydride function, beta-amido acids.

Examples of polymers usable as polymer block B in copolymers of A-B type in the present process, are quaternized poly(vinyl-2-pyridine), quaternized poly-vinyl-4 pyridine), quaternized or non quaternized poly (dimethylaminoethyl methacrylate), hydrolyzed and salified vinyl acetate, quaternized amidated polyisoprene and hydrolyzed and/or salified polyisoprene anhydride.

Specific examples of usable A-B copolymers are the following:
polystyrene-quaternized poly(vinyl-2 pyridine)
polystyrene-quaternized poly(vinyl-4-pyridine),
polystyrene-quaternized poly(methyl-2 vinyl-5 pyridine),
polystyrene-anhydrated and hydrolyzed or salified polyisoprene,
polystyrene-quaternized amidated polyisoprene,
polystyrene-poly(dimethylaminoethyl methacrylate),
polystyrene-quaternized poly(dimethylaminoethyl methacrylate),
polystyrene-hydrolyzed and/or salified poly(trimethylsilyl methacrylate)
polystyrene-quaternized poly(vinyl-2 pyridine),
polyisoprene-quaternized poly(vinyl-4 pyridine),
poly(hexyl methacrylate)-poly(dimethylaminoethyl) methacrylate,
poly(heptyl methacrylate)-poly(dimethylaminoethyl methacrylate),
polydimethylsiloxane-quaternized poly(vinyl-2 pyridine),
polydimethylsiloxane-quaternized poly(vinyl-4 pyridine),
polydimethylsiloxane-poly(dimethylaminoethyl methacrylate),
polydimethylsiloxane-anhydrated, and hydrolyzed or hydrolyzed and salified, anhydrated polyisoprene, and salified
poly(vinyl chloride)-hydrolyzed or hydrolyzed and salified poly(vinyl acetate)
polystyrene-polyacrylamide,
polystyrene-polymethylacrylamide,
polystyrene-poly(acrylic acid), salified or not,
polystyrene-polyvinylpyrrolidone,
polystyrene-poly(styrene sulfonic acid).

It will be noted that said treatments to which the polymers of block B are subjected in order to make them polar, increase the polarity thereof or make them ionogenic are known per se. Thus, it is possible, by way of example, to effect a free-radical grafting or maleic anhydride on polyisoprene or to react an amide on the double-bonds of polyisoprene. In order to realize copolymers A-B having a more efficient block B, it is preferred to use polymer blocks B having been quaternized by hydrochloric acid, sulfuric acid or phosphoric acid, with particular preference for hydrochloric acid.

It has been found in accordance with the invention that block B of copolymer A-B can be quaternized in a particularly effective manner if it is reacted with an amount of a quaternizing agent corresponding to 1 to 10 times, preferably about 5 times, the stoichiometric amount.

The preparation of copolymers of the A-B type can be effected by anionic polymerization of a suitable monomer to provide block A and by subsequent polymerization of block B on the living polymer of block A, the block B being thereafter advantageously quaternized by suitable means.

Respective blocks A and B of the aforesaid A-B copolymers may have equal or different lengths. Preferred A-B copolymers for the considered process are those having the two blocks of different lengths and advantageously a molecular weight ratio of between 0.1 and 10. Indeed, it has been noted that it is possible to obtain in such a case suspensions of fine particles in aqueous medium and the best results in this respect have been obtained when the shortest block is the lipophilic block.

The lengths of blocks A and B may vary considerably but optimum results are obtained with blocks the molecular number weights of which are comprised between 1000 and 200,000.

It has been ascertained that a short lipophilic block A, representing 50 to 10% by weight of the total mass of the copolymer A-B permitted an increase by a factor of 10 to 30 of the efficiency of said copolymer A-B in the process of the invention, said efficiency being measured by its susceptibility of providing a suspension of constant and uniform particle size for a given concentration in water of the monomer to be polymerized in aqueous suspension.

As will be seen in example 9 hereunder, the presence of two blocks A and B is indispensable for a suitable completion of the process since if the lipophilic sequence, for example, is reduced to 0, it would not be possible anyhow to obtain a dispersion leading to suitable polymerization of the monomer, but either a mass-setting of the latter, or at least a bulk of beads, the size dispersity of which is very wide.

It has moreover been found, in accordance with the invention, that the A-B copolymer is active, in the free-radical polymerization of dispersed vinyl monomers, at concentrations as low as 0.05 per thousand, even less, calculated in weight by weight of the vinyl monomer to be polymerized and that the maximum useful concentrations are about 5 for thousand by weight/weight of vinyl monomer to be polymerized, said value depending however to a certain extent on the components of the system since, beyond indicated values, a mass setting may frequently occur.

As an alternative, it is possible to use again the liquid of the dispersion from which there have simply been extracted by conventional means the beads or balls of the formed polymer, for a new cycle of polymerization according to the invention, without necessity of reintroducing copolymer A-B as long as the concentration of the latter is not less than 0.05 per thousand, with simply a supply of the reaction vessel with additional amounts of vinyl monomer and a polymerization promotor.

In the process of the invention, the weight ratio of dispersion liquid to monomer can be very considerably and can have any value conventionally used in this art. This ratio may be for example between 7:1 and 1:1.

The polymerization initiator(s) or promoter(s) are introduced in an amount corresponding, in each specific case to the required degree of polymerization. In practice, the amount of introduced promoter is set at about 0.3 to 1% by weight of the treated vinyl monomer, it being understood that any other suitable value could be used.

Optimum temperature and pressure for effecting the polymerization of the invention, as well as the time of the reaction, depend in each case on the materials to be treated and said variables can be easily determined in each case by routine experiment within the knowledge of those skilled in the art.

In the practice, the temperature can be from 0 to 150° C and the pressures may be from 1 to 20 bars for the most common vinyl monomers. It will however be noted that said temperature and pressure have to be adjusted as a function of the monomers and promoters use etc....

The process of the invention enables polymer beads or balls to be obtained by dispersed-phase polymerization in a liquid, with very low amount of added block copolymer, said process giving transparent vinyl polymer beads or balls which are substantially free of extraneous materials not found in the base monomer.

Although the applicant does not wish to be bound to any theoretical explanation, it is believed that with such small amounts, the block copolymer of the type A-B acts both as a protective colloid for monomer granules and as a surface active, emulsifying or dispersing compound.

A considerable advantage derived from the process of the invention is the very great flexibility thereof and that by regulating operational conditions as well as amounts and proportions of the components, in particular of the A-B copolymers and of the respective polymer blocks thereof, it is possible to control and vary the size, the shape and the granulometric dispersion of the beads or balls of the produced polymer at will.

More specifically, with respect to parameters concerning the block copolymer A-B itself, it is possible to manipulate the respective lengths of blocks A and B, modify the chemical nature of each of them and also vary the degree of the modification in order to increase the polarity, as aforesaid, of the hydrophilic block B and the thus obtain beads or balls of the vinyl polymer, the characteristics of which can be determined at will.

A further advantage of the present process is that it is possible to obtain, contrary to the state of the prior art of which the applicant is aware, by means of such polymerization in this type of liquid dispersion, transparent beads of polymer having variable size and preferably diameters greater than 1 mm, with a narrow distribution of granulometric sizes of beads or balls; thus when the average diameter 7 particles is for example 0.70 mm, about 95% of beads have a diameter between 1.0 and 0.63 mm, if operational conditions are suitably selected for carrying out the present process.

Such a flexibility and regularity of the results are quite impossible with conventional suspension-polymerization methods using soaps or protective colloids or, as was often the case, a combination of both.

A further advantage of the invention is that the obtained vinyl polymer does not need processing other than the one comprising a simple rinsing after separating the dispersion liquid, for eliminating in a more complete manner the slightly acid mother-liquors.

The process of the invention has a further advantage to not cause any foaming during polymerization, what happens frequently in conventional method.

In practice the balls or beads, thereafter called particles of the polymer which have been collected can have variable sizes between about 0.5 micron and 5mm diameter, the distribution of diameters of the particles in the dispersion being very narrow, the average diameter $\bar{d}_s$ of the polymer particles (or the diameter of a particle having an average area) being represented by the formula:

$$\bar{d}_s = \sqrt{\frac{\Sigma \frac{m_i}{d_i}}{\Sigma \frac{m_i}{d_i^2}}}$$

wherein $m_i$ is the mass of the fraction of particles having a diameter $d_i$.

On the other hand the polydispersity into molecular masses of the formula:

$$\frac{\bar{M}_w \text{ (av. wt mass)}}{\bar{M}_n \text{ (av. nr mass)}}$$

in beads or balls obtained by the invention is exceptionally low; it may easily be, in each specific case, as low as 1.9 to 2.

These beads or balls can be used for all known applications of vinyl polymers and, for instance, for producing expanded polystyrene or poly(methyl methacrylate) or other vinyl polymers, usable as described i.a. in Dictionnaire des Matieres Plastiques et de leurs Applications, Jean Delorme, Ed. Amphora, Paris (1958).

The invention will now be further illustrated by the following examples, given merely by way of an explanation and without any intent to limitation:

EXAMPLE 1

In one liter of styrene monomer of commercial source, previously freed from inhibitors contained thereby by passage through a column of neutral and basic aluminas, positioned in alternate layers having each 4 cm thickness, have been dissolved 3 g of benzoyl peroxide.

On the other hand, there has been dispersed in 1.3 l water 0.5g of polystyrene-poly (vinyl-2-pyridine) copolymer having a molecular mass number values of 20 000 for polystyrene block and 50 000 for poly(vinyl-2-pyridine) block the latter block being quaternized by reaction with 6 times the stoichiometric amount of hydrochloric acid.

The 2 "solutions" thus prepared have been introduced into a reactor of SFS type (manufactured by Ingenieurburo S.F.S. Zurich Switzerland), the stirring being kept constant at a value of 500 rpm. The temperature has been raised to 90° C and kept at this value during 9 hours.

After cooling, there have been collected 950 g of polystyrene balls of diameter which is substantially 0.7 mm and the polydispersity in size of which is very low, said collection having been effected by a simple filtering of the reactor content, if necessary followed by a rinsing adapted to free the product from slightly acid mother-liquors.

EXAMPLE 2

The process has been carried out as shown in example 1 but by modifying the nature and the concentration (C°/oo) of A-B copolymer the polymer blocks A and B of which had number molecular as masses respectively of $M_A$ and $M_B$. All other factors being alike, except the initial concentration of monomer in water (vol. %) shown hereafter, the results are as shown in Table I hereafter.

TABLE I

| | Copolymer A-B | $M_A$ | $M_B$ | $C°/_{\infty}$ wt/wt monomer | Monomer wt%/wt water | Diameter of particles |
|---|---|---|---|---|---|---|
| 1 | $PD_3$-$PMad^+$, $Cl^-$ | $20.10^3$ | $25.10^3$ | 4.5 | 25 | 150μ |
| 2 | PS-$PV_2P^+$, $Cl^-$ | $2.10^3$ | $2.10^3$ | 4.5 | 25 | 0,8 mm |
| 3 | PS-$PV_4P^+$, $Cl^-$ | $20.10^3$ | $15.10^3$ | 4.5 | 25 | 2 μ |
| 4 | PS-$PV_2P^+$, $Cl^-$ | $2.10^3$ | $2.10^3$ | 2.6 | 44 | 3 mm |
| 5 | PS-$PV_2P^+$, $Cl^-$ | $20.10^3$ | $20.10^3$ | 2.6 | 44 | 1,5 mm |
| 6 | PS-$PV_2P^+$, $Cl^-$ | $2.10^3$ | $20.10^3$ | 2.5 | 40 | 20μ |
| 7 | PS-$PV_4P^+$, $Cl^-$ | $20.10^3$ | $15.10^3$ | 2.5 | 32 | 2μ |
| 8 | PS-$PV_4P^+$, $Cl^-$ | $20.10^3$ | $15.10^3$ | 0.28 | 35 | 3 mm |
| 9 | PS-$PV_4P^+$, $HSO_4^-$ | $20.10^3$ | $15.10^3$ | 4.4 | 55 | 1.5 mm |
| 10 | PS-$PV_2P^+$, $HSO_4^-$ | $2.10^3$ | $2.10^3$ | 4.4 | 55 | 6 mm |
| 11 | PS-$PV_2P^+$, $HSO_4^-$ | $2.10^3$ | $2.10^3$ | 3.5 | 44 | 3 mm |
| 12 | PS-$PV_2P^+$, $HSO_4^-$ | $2.10^3$ | $2.10^3$ | 2.7 | 35 | 1.5 mm |
| 13 | PS-$PV_2P^+$, $HSO_4^-$ | $2.10^3$ | $2.10^3$ | 2.5 | 32 | 1 mm |

The abbreviations used in this Table and in the following examples have the meanings hereafter:
$PD_3$ = polydimethylsiloxane
PS = polystyrene
PMad = poly(dimethylaminoethyl methacrylate)
$PV_2P^+$ = quaternized poly(vinyl-2-pyridine)
$PV_4P^+$ = quaternized poly(vinyl-4-pyridine)

It ensues from this table that, for a block copolymer A-B of a given composition, it is possible to modify the size of polymer balls obtained thereby by changing the concentration of said copolymer and/or that of the starting monomer, styrene in this case. On the other hand the interest of the quaternizing agent will become apparent by comparing lines 5 and 12 of table I.

EXAMPLE 3

The operations have been similar to those of example 1 but with use of a block copolymer A-B which is a copolymer of polystyrene and poly(vinyl-2-pyridine) quaternized by p-toluene-sulfonic acid at a concentration of 2.5/1000 (wt/wt of monomer styrene to be polymerized); molecular masses $M_A$ and $M_B$ of the two blocks A and B of this copolymer are both 2000 and the concentrations of styrene monomer in water are 44 vol%; polystyrene beads having an average size of about 100 microns have been thus obtained and separated by simple filtration.

EXAMPLE 4

By operating as in Example 1 but with use of concentrations and compositions shown hereunder, there have been obtained the following results which show that an increase of A-B copolymer concentration by a factor of 8 may lead (all other parameters being equal) to a decrease by a factor of 10 to 15 of the average size of polystyrene particles or beads:

| Copolymer A-B | $M_A$ | $B_A$ | $C°/_{\infty}$ | Monomer % | Diameter of particles |
|---|---|---|---|---|---|
| PS-$P_4VP^+$, $Cl^-$ | 20,000 | 30,000 | 0.8 | 40 | 0.1 mm |
| PS-$PV_4P^+$, $Cl^-$ | 20,000 | 30,000 | 0.1 | 40 | 1.5 mm |

EXAMPLE 5

By operating as illustrated in Example 1, it has been possible to demonstrate that the size of polymer beads increases with concentration of the starting monomer, but also that the appearance and the shape of these beads are slightly modified. Thus for a concentration of styrene in water as high as 55 vol % and using an A-B copolymer of the type PS-$PV_4P^+$,$Cl^-$, having molecular masses $M_A = 2000$ and $M_B = 20\,000$, at a concentration of 2.5°/oo wt/wt of starting monomer, there have been obtained beads having the shape of flattened rice grains of about 3 mm length.

EXAMPLE 6

By operating as in Example 1 but using a block copolymer A-B of the type polystyrene-anhydridated polyisoprene portion of which had been salified with potassium hydroxyde (said polyisoprene block had been anhydrated by fixing 20 wt % of maleic anhydride thereon). The pH of the reactor content has been raised to about 10. The molecular mass $M_A$ being 20 000 and the molecular $M_B$ being 20 000, there has been obtained with a concentration wt/wt of styrene monomer of 5°/oo of copolymer A-B with polymerization effected during two hours with a stirring at a rate of 400 rpm, thereafter during 7 hours at a stirring rate of 500 rpm, at a temperature of 80° C during the first 7 hours, then 90° C during the two subsequent hours, polystyrene balls having about 5 mm diameter.

EXAMPLE 7

There have been effected several successive polymerizations of styrene as indicated in table II hereunder, by reusing quantitatively each time the filtering waters provided after separation by filtering of the formed polymer. Thus, after a simple addition of new feed of monomer styrene and benzoyl peroxide (promotor), it has been possible to obtain polystyrene by 3 successive polymerizations, without any further addition of A-B copolymer or of $H_2SO_4$, (the concentration C of copolymer A-B in the first of said successive polymerization had been 2.7°/oo).

TABLE II

| | | Copolymer A-B | $M_A$ | $M_B$ | Monomer % | Diameter of particles |
|---|---|---|---|---|---|---|
| 1st | polymerization | PS-$PV_2^+$,$HSO_4^-$ | 20 000 | 20 000 | 35 | 1.5 mm |
| 2nd | '' | '' | '' | '' | '' | 2 mm |

TABLE II-continued

|  | Copolymer A-B | $M_A$ | $M_B$ | Monomer % | Diameter of particles |
|---|---|---|---|---|---|
| 3rd | " | " | " | " | 2 mm |

EXAMPLE 8

In one liter of styrene monomer was dissolved 3 g of benzoyl peroxide.

On the other hand, there has been dispersed in 1 liter of water 1 g of A-B copolymer polystyrene-quaternized poly(vinyl-2-pyridine) with 0.1N HCl 1 in an amount of 6 times the proportion of HCl required by stoichiometry having molecular masses $M_A = 4000$ and $M_B = 40\,000$.

The two mixtures have been introduced in a reactor SFS, the stirring of which has been kept at 500 rpm; the temperature has been raised to 90° C and said conditions have been kept during 12 hours. After stopping of the reactor and filtering, there have been obtained 985 g of polystyrene beads having a molecular weight in number of 80.000 and a polydispersability of molecular masses from 1.9 to 2.

EXAMPLE 9

Operating as in Example 8, the lengths of respective blocks of A-B copolymer of the type $PS-PV_2P^+$, $Cl^-$, have been varied. For the same value of pH of the medium and using identical concentrations of styrene monomer in water and of A-B copolymer with respect to monomer, there have been obtained polystyrene beads or balls having the following sizes:

| $M_A \times 10^{-3}$ | $M_B \times 10^{-3}$ | Size (diameter of balls) |
|---|---|---|
| 2 | 2 | 5.5 mm |
| 2 | 20 | 60 µ |
| 0 | 20 | no balls (mass setting) |

EXAMPLE 10

There have been dissolved in one liter of monomer styrene 3g of benzoyl peroxide and they have been introduced into a SFS reactor kept under stirring at 600 rpm, together with water (weight ratio styrene: water = 2:5) in which has been previously dispersed an A-B copolymer in an amount such that it should represent 0.07°/oo by weight of used styrene.

Said A-B copolymer was polystyrene-quaternized poly(vinyl-2-pyridine) in which block A had a number molecular weight $M_A = 20\,000$ and block B had a number molecular weight $M_B = 50\,000$, the latter block having been quaternized by 0.1N HCl in an amount representing 10 times the stoechiometrically required proportion.

Under constant stirring the temperature has been raised to 90° C in the course of 9 hours.

After stopping of the reactor and filtering, there have been obtained polystyrene beads having a mean diameter $\bar{d}_s = 1.4$ mm (yield over 90%).

EXAMPLE 11

In 100 g of a methyl methacrylate monomer, has been dissolved 0.3g of benzoyl peroxide. The mixture has been introduced into a SFS reactor, the stirring being kept at 600 rmp after having introduced therein 700 cc water containing a previously dispersed A-B copolymer of the type polystyrene-quaternized poly(vinyl-2-pyridine), in an amount such that the copolymer represented 0.8°/oo (wt/wt) of the used methyl methacrylate.

In the copolymer A-B the molecular mass of block A was 2000 and that if block B was 10 000, the latter block having quaternized with 0.1N HCl in an amount representing 10 times the stoichiometrical requirement.

Under constant stirring at 600 rpm, the temperature has been raised to 80° C and kept at this value during 5 hours.

After stopping of the reactor and filtering, there have been obtained 96 g of beads of poly(methyl methacrylate) having an average diameter $\bar{d}_s = 0.3$ mm.

EXAMPLE 12

In 500 cm³ water has been dispersed 0.15 g of a polystyrene-poly(vinyl-2-pyridine) copolymer quaternized with ethyl bromide. In this A-B copolymer lipophilic block A has an average molecular mass of 20,000, whereas hydrophilic block B had an average molecular mass of 200,000.

300 cm³ of styrene containing 3g of benzoyl peroxide were added thereto, in a SFS reaction vessel or reactor and the temperature has been raised to 90° C and maintained at this value for 9 hours, this being done under constant stirring at 700 rpm.

After stopping of the reactor and filtering there have been obtained 291 g of polystyrene beads with an average diameter of 0.6 mm.

It is to be understood that numerous changes can be made in the described embodiments, the scope of the invention being only defined by the appended claims.

We claim:

1. A process for the free-radical polymerization of vinyl monomers, suspended in water, comprising the steps of: dispersing a block copolymer of the A-B type selected from the group consisting of:
   polystyrene-quaternized poly(vinyl-2-pyridine),
   polystyrene-quaternized poly(vinyl-3-pyridine),
   polystyrene-quaternized poly(methyl-2 vinyl-5 pyridine)
   polystyrene-anhydrated and hydrolyzed or salified polyisoprene,
   polystyrene-quaternized amidated polyisoprene,
   polystyrene-poly(dimethylaminoethyl methacrylate)
   polystyrene-quaternized poly(dimethylaminoethylmethacrylate),
   polystyrene-hydrolyzed and/or salified poly(trimethylsilyl methacrylate),
   polyisoprene-quaternized poly(vinyl-2-pyridine),
   polyisoprene-quaternized poly(vinyl-4-pyridine),
   poly(hexyl methacrylate)-poly(dimethylaminoethyl)methacrylate,
   poly(heptyl methacrylate)-poly(dimethylaminoethyl methacrylate),
   polydimethylsiloxane-quaternized poly(vinyl-2-pyridine), polydimethylsiloxane-quaternized poly(vinyl-4-pyridine), polydimethylsiloxane-poly(dimethylaminoethyl methacrylate),
polydimethylsiloxane anhydrated, and hydrolyzed or hydrolysed and salified anhydrated polyisoprene,
poly(vinyl chloride), hydrolyzed or hydrolysed and salified poly(vinyl acetate),
polystyrene-polyacrylamide,
polystyrene-polymethacrylamide,
polystyrene-poly(acrylic acid) salified or not,
polystyrene-polyvinylpyrrolidone,
polystyrene-poly(styrene sulfonic acid),
wherein A represents a lipophilic polymer block and B represents blocks A and B of said block copolymer are present in a respective molecular weight ratio of about 0.1 to 10; adding at least one vinyl monomer to be polymerized and containing a polymerization promoter to said dispersion, wherein the amount of block copolymer ranges from 0.05–5.0 parts by weight per thousand parts by weight of vinyl monomer; and heating the mixture with stirring to the desired polymerization temperature.

2. The process of claim 1, wherein said block copolymer is:
polystyrene-quaternized poly(vinyl-2-pyridine),
polystyrene-quaternized poly(vinyl-4-pyridine),
polystyrene-quaternized poly(methyl-2 vinyl-5 pyridine),
polystyrene-anhydrated and hydrolyzed or salified polyisoprene,
polystyrene-quaternized amidated polyisoprene,
polystyrene-poly(dimethylaminoethyl methacrylate),
polystyrene-quaternized poly(dimethylaminoethylmethacrylate),
polystyrene-hydrolyzed and/or salified poly(trimethylsilyl methacrylate),
poly(hexyl methacrylate)-poly(dimethylaminoethyl)-methacrylate,
poly(heptyl methacrylate)-poly(dimethylaminoethyl methacrylate),
polystyrene-polyacrylamide,
polystyrene-polymethylacrylamide,
polystyrene-poly(acrylic acid) salified or not,
polystyrene-polyvinylpyrrolidone, or
polystyrene-poly(styrene sulfonic acid).

3. The process of claim 1, wherein said block copolymer is
polyisoprene-quaternized poly(vinyl-2-pyridine) or
polyisoprene-quaternized poly(vinyl-4-pyridine).

4. The process of claim 1, wherein said block copolymer is:
polydimethylsiloxane-quaternized poly(vinyl-2-pyridine),
polydimethylsiloxane-quaternized poly(vinyl-4-pyridine),
polydimethylsiloxane-poly(dimethylaminoethyl methacrylate),
polydimethylsiloxane anhydrated, and hydrolyzed or hydrolysed and salified anhydrated polyisoprene,
poly(vinyl chloride), hydrolyzed or hydrolysed and salified poly(vinyl acetate).

5. The process according to claim 1, wherein the vinyl monomers are selected from the group consisting of substituted or non-substituted styrene, alkyl acrylates and methacrylates, vinyl acetate, acrylonitrile, vinyl chloride and other halogenated vinyl compounds.

6. The process according to claim 1, wherein the polymer forming the block B of the copolymer A-B is quaternized by means of an amount of a quaternizing agent corresponding to 1 to 10 times the stoichiometrical proportion.

7. The process according to claim 1, wherein block A of copolymer A-B represents 10 to 50% by weight of the total weight of said copolymer.

8. The process according to claim 1, wherein blocks A and B of block copolymer A-B have each number molecular weights between about 1000 and 200,000.

9. The process according to claim 1, wherein the polymerization is effected at a temperature of 0° C to 150° C under pressure of 1 to 20 bars.

10. The product comprizing beads or balls of vinyl polymer when prepared by the process of claim 1, said product being transparent and substantially free of materials extraneous to the base monomers.

* * * * *